Aug. 21, 1962    J. R. HOWE ET AL    3,050,321
AUXILIARY DRIVE CLUTCH MECHANISM
Filed Nov. 15, 1957    3 Sheets-Sheet 1

INVENTORS
JOHN R. HOWE
BY JOSEPH J. COOK
*BMJensenger*
ATTORNEY

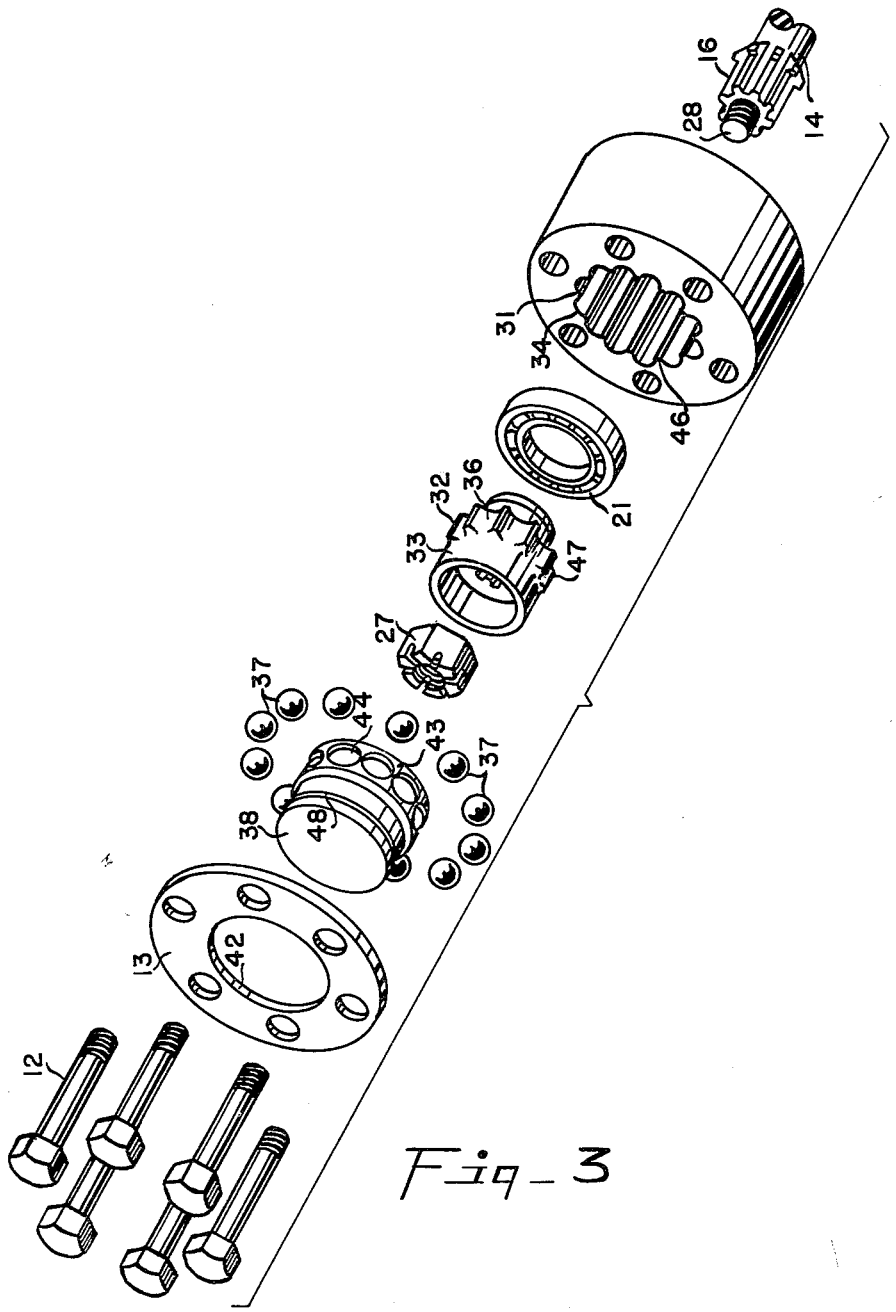
Fig_3

United States Patent Office 3,050,321
Patented Aug. 21, 1962

3,050,321
AUXILIARY DRIVE CLUTCH MECHANISM
John R. Howe, 2135 Meade St., and Joseph J. Cook, 1064 Adams St., both of Denver, Colo.
Filed Nov. 15, 1957, Ser. No. 696,692
1 Claim. (Cl. 287—53)

The present invention relates to a clutch mechanism adapted for use in conjunction with vehicles having "four-wheel" or other type auxiliary drives in which it is desirable to selectively connect and disconnect the auxiliary drive members. While being adaptable to other types of auxiliary drive arrangements, the present invention is particularly adapted for use on the front wheel or auxiliary drive system of "jeep" type vehicles.

The main object of this and of other prior inventions, inclusive of a copending application filed by the present joint inventors on June 25, 1956, bearing Serial No. 593,745, now Patent No. 2,948,557, granted August 9, 1960, has been to provide means for uncoupling the drive connection between the front drive axles and the front wheels, so that rotation of the auxiliary drive mechanism inclusive of front axles, differential, drive shaft, etc., does not occur when such drive mechanism is disengaged from the engine.

Additional objectives which further define the main objective set forth above and which guide the development of the present invention include the following: To provide a selective clutching mechanism for auxiliary drive mechanisms that is sturdy, compact and rugged; to provide a selective clutching mechanism that incorporates a positive acting coupling device intermediate the drive axle and wheel; to provide a clutching mechanism of the foregoing type incorporating a bearing member for multi-directional rotation intermediate the drive axle and the wheel; to provide means for readily moving the coupling member to selected engaged or disengaged positions; and to provide means for use with said coupling member which assures easier engagement and disengagement thereof irrespective of the relative rotational positions of drive and driven members.

Figure 1:
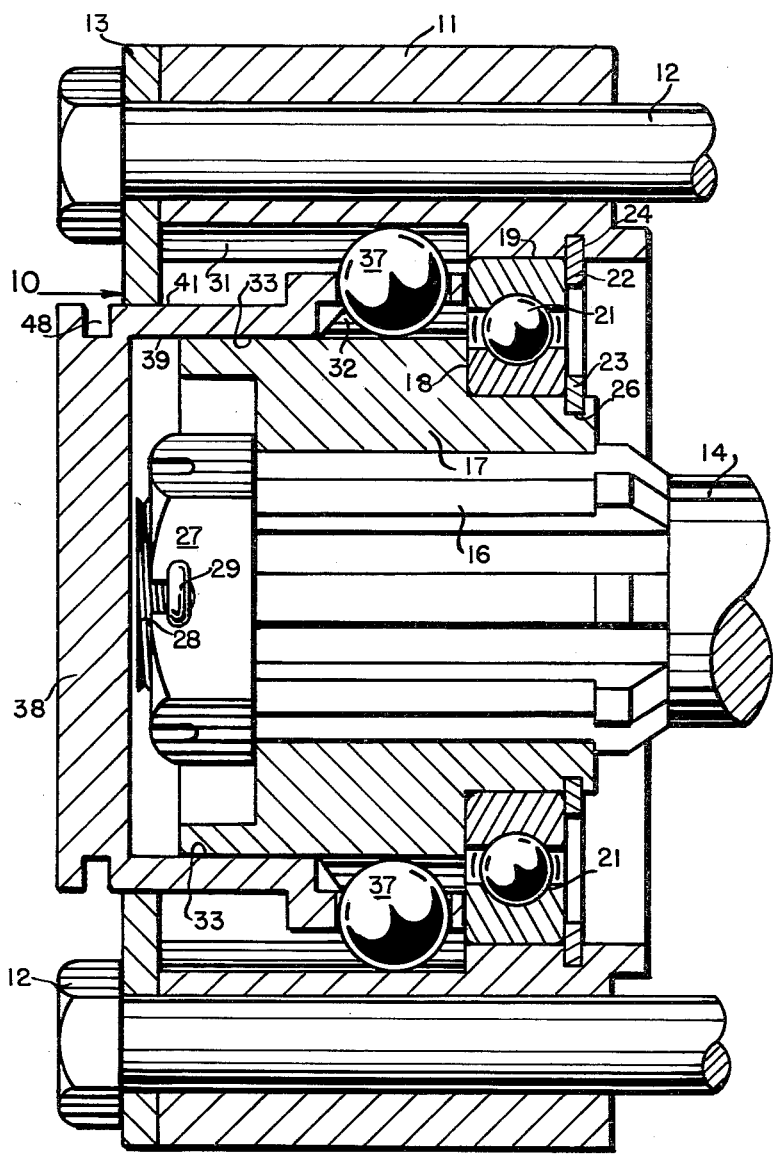
Figure 2:
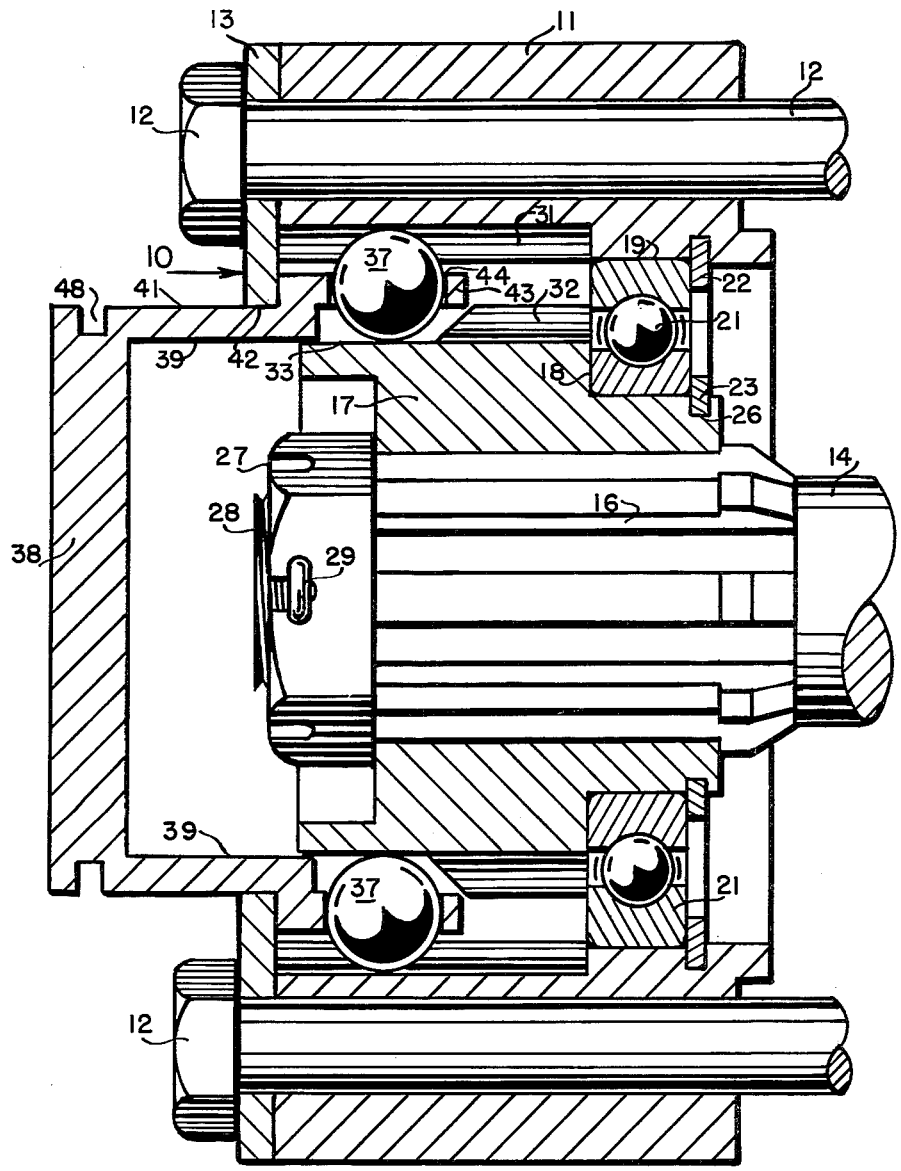

Further objects and advantages of the present invention will be apparent from the appended description and drawings, in which FIG. 1 is an elevation in partial section showing elements of the present invention in their engaged relation, FIG. 2 is an elevation in partial cross-section showing further features of the present invention and showing the elements of the device in disengaged position, and FIG. 3 is a perspective view showing the elements and mechanisms of the present invention in disassembled aligned relation.

Briefly stated, the present invention provides a clutch mechanism adapted for operation intermediate the drive axle of an auxiliary drive vehicle and the wheels associated therewith so that the drive connection ordinarily existing between the wheels and axle may be selectively engaged or disengaged as desired. The major operative elements of the invention include an internally splined housing and a hub having a partial spline on the exterior face thereof. A bearing is disposed between said hub and housing to provide rotational support for the hub and drive axle within the housing, and a slide clutch member having a ball cage element is adapted to move reciprocally so that bearing balls received in the ball cage will move from a first disengaged position wherein the bearing balls are in contact with the splines of the housing and the smooth face of the hub and a second engaged position wherein the bearing balls are still in engagement with the same elements but are further restrained from movement by the splines on said hub.

The detailed features of the present invention will be more clearly understood with reference to the drawings, in which it is shown that the external housing 11 is adapted to be engaged to a wheel of an auxiliary drive vehicle (not shown) by a plurality of long cap screws 12 passing through the hub and closure plate 13 to hold the assembled clutch unit 10 in place on the vehicle wheel. Once properly positioned on the wheel, the axle drive shaft 14 having splines 16 thereon will be disposed centrally of the housing 11. In order to maintain its proper centrally disposed position and in order to provide additional support for said drive axle 14, a hub 17, which is cooperatively splined internally to mate with the splines 16 of the axle 14, is positioned on said drive axle 14 in such manner that shoulder 18 is properly aligned with the internal cylindrical surface 19 of the housing 11, so that a conventional type ball bearing structure 21 may be positioned between these two members.

As shown, snap rings 22 and 23 are provided for engagement in the grooves 24 and 26 of the housing and hub respectively in order to hold the ball bearing structure 21, the housing 11, hub 17, and drive axle 14 in their proper assembled relation. With the use of such snap rings and with the further use of castellated nut 27 and cotter pin 29 on the threaded end 28 of the axle 14, correct alignment of all elements is assured.

Through use of the elements and the portions thereof described, a free-wheeling type arrangement is attained which would make it possible to eliminate the unnecessary rotation of the drive elements of the auxiliary drive mechanism when the "four-wheel" drive configuration is not in use. Since it is desirable, however, to provide mechanism for selectively connecting or disconnecting the drive connection in such configuration, additional operative elements are provided. These elements include the provision of internal splines 31 on the inner face of the housing 11 and a partial external spline 32 raised above the ordinarily smooth external face 33 of the hub 17. As most clearly shown in FIG. 3, these splines are of substantially epicyclic form, so that the grooves 34 and 36 have curved or cylindrical surfaces adapted to receive and conform to the outer diameter of bearing balls 37 which are adapted to fit between the splines 31 and 32 and in the grooves 34 and 36 when the bearing balls 37 are moved into their engaged position, as shown in FIG. 1. In order to facilitate the movement of the bearing balls 37 from the disengaged position, as shown in FIG. 2, where the balls are received in groove 34 but are disposed for free movement on the smooth cylindrical face 33 of the hub 17 toward the engaged position, a clutch member 38 is provided. This clutch member 38 is a barrel type structure adapted to move reciprocally inwardly and outwardly with an inner face 39 in sliding contact with the cylindrical face 33 of hub 17 and an outer face 41 in contact with the circular opening 42 in closure plate 13.

The innermost end of the clutch member 38 is essentially a ball cage 43 having a plurality of openings 44 adapted to receive and hold the bearing balls 37. With the use of such ball cage 43, the bearing balls 37 may be moved reciprocally from a disengaged position to the engaged position between the splines 31 and 32. Because of the fact that the balls 37 and the grooves 34 and 36 are relatively large when compared to the ridges 46 and 47 of the splines 31 and 32, it will be relatively easy to move the balls 37 into their engaged position even though the splines 31 and 32 are not exactly aligned. In fact, pressure exerted against the clutch member 38 and transmitted by the ball cage 43 will be adequate to move the splines 31 and 32 into their aligned positions even though such aligning movement necessitates slight rotation of the vehicle wheel or drive axle 14.

To facilitate shifting of the clutch member 38 to and from engaged positions, a groove 48 is provided adjacent the outer end of the clutch member 38, so that a tool may be inserted therein to aid in shifting.

The completed structure as described provides a completely enclosed, compact, sturdy and serviceable clutch mechanism which is well adapted to the objectives set forth. In the presentation of one embodiment of the invention which satisfies such objectives, it will be apparent that the present invention is adaptable to modifications and changes. All such modifications and changes as come within the scope of the hereunto appended claim are deemed to be a part of this invention.

What is claimed is:

A clutch unit for use on the auxiliary drive assembly of multiple axle drive vehicles to selectively interconnect the drive axle and wheels comprising a hub member secured to the axle providing at its inner extremity an external cylindrical surface, a housing secured to the wheel and providing through a portion of its length an internal cylindrical surface in position aligned with the first named external cylindrical surface, a bearing element between said surfaces, snap rings on said hub member and housing for engagement with said bearing element to hold said cylindrical surfaces and the respective housing and hub members in aligned positions, splines on said hub member raised above said first named external cylindrical surface, splines on said housing, a second cylindrical surface on said hub member positioned adjacent said splines toward the outer extremity of said hub member and away from said first named external cylindrical surface, a plurality of balls adapted for contact with said second cylindrical surface, said balls being reciprocally movable along said second cylindrical surface for selective member interconnecting interposition between the splines of said housing and hub member, and a barrel type clutch actuating member inclusive of a cage element movable therewith for holding said balls in engaged and disengaged positions, said barrel type clutch actuating member extending externally from said housing for rotation therewith and with cylindrical surfaces of said barrel type clutch actuating member in sliding contact with said housing and the said second cylindrical surface of said hub member for enclosing the interior of said clutch unit when in the engaged and disengaged positions and for maintaining said barrel type clutch actuating member and hub in aligned relation.

References Cited in the file of this patent

UNITED STATES PATENTS

| 1,170,784 | Sunden | Feb. 8, 1916 |
| 2,291,151 | Dunn | July 28, 1942 |
| 2,788,103 | Requa | Apr. 9, 1957 |
| 2,855,768 | Plano | Oct. 14, 1958 |

FOREIGN PATENTS

| 437,343 | Great Britain | July 16, 1934 |